April 26, 1932.　　　A. OSWALD　　　1,855,198

PRODUCTION OF FILMS FOR PROJECTION OF COLORS

Filed Nov. 1, 1926

Inventor:
Andre Oswald
by Arthur Wright
Attorney.

Patented Apr. 26, 1932

1,855,198

UNITED STATES PATENT OFFICE

ANDRÉ OSWALD, OF PARIS, FRANCE, ASSIGNOR, BY MESNE ASSIGNMENTS, TO KELLER-DORIAN COLORFILM CORPORATION, OF NEW YORK, N. Y., A CORPORATION OF DELAWARE

PRODUCTION OF FILMS FOR PROJECTION OF COLORS

Application filed November 1, 1926, Serial No. 145,713, and in France November 16, 1925.

The object of this invention is to provide a method of impressing or embossing microscopic parallel lines and to goffer or crimp by means of such treatment photographic and motion picture films so as to obtain a reproduction in natural colors.

The number of lines to be impressed in order to obtain a sufficiently fine and sufficiently sharp reproduction of such colors varies between 12 and 35 lines per millimeter while films of the same kind hitherto used in the trade hardly comprise more than 8 lines per millimeter.

I have discovered that the desired fine impressing or embossing is obtainable by the usual means, that is to say by means of highly accurate dividing machines as hereinafter described.

Such embossing can be made on plates or on cylinders and either in hollow or in relief. The lines may offer a section either round or V-shaped, or rectangular or trapezoidal. The lines are parallel respecting one another and arrangeable in any manner respecting the edges of the film. The embossing is intended for goffering photographic or motion picture films, the surfaces of which are thereby transformed into a multitude of tiny juxtaposed lenses of substantially hemicylindrical form.

Every one of these lenses will produce on the sensitized layer a complete image of the main picture-taking objective. Any color-selecting filter or screen designed to cause the said objective to appear as colored zones in the lines embossed or impressed on the film will therefore enable the registration, at every point of the image, of the colored radiations such as they will appear after passing through the filter.

The path of light rays being reversible, those same films, used with a projection apparatus similar to the picture-taking camera, will reconstitute the image in natural colors on the screen.

Figure 1:
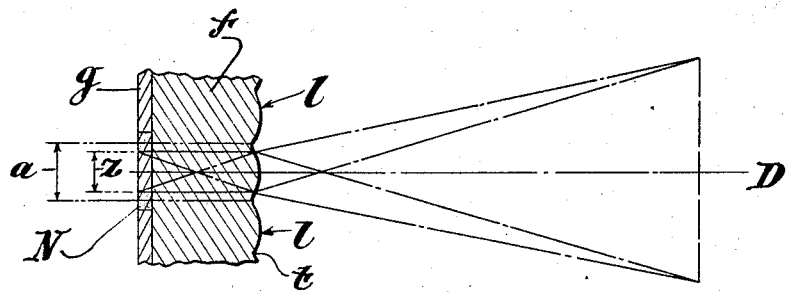
Figure 2:
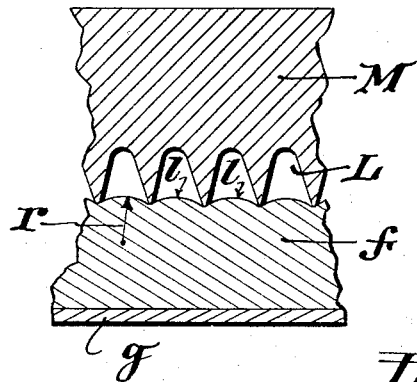

In the accompanying drawings, Figure 1 is a diagram indicating the passage of the light rays through a film goffered in accordance with the invention, and Fig. 2 is a fragmental detail sectional view illustrating the goffering of the film.

The microscopic hemicylindrical lenses $l$ (Fig. 1) are separated by regions $t$ more or less wide according to the grade of the embossing produced; but, in any case, such regions produce dead spaces in the sense that light coming from the objective to those regions does not get distributed over the zones $z$ which constitute on the film $f$ the image of the color-selecting filter D placed in the diaphragm of the picture-taking objective, which zones or spaces will hereinafter be termed "image zones".

With a certain aperture of the objective, if the goffering is broad enough, that is to say if the number of microscopic lenses per millimeter of film as counted perpendicularly to the axis of the lenses, is small enough, or even if the zone $a$ is large enough, the image zones $z$ will cover a restricted fraction of the surface corresponding to each microscopic lens and the useful light appertaining to each said lens will thus concentrate its effect on a more restricted surface, the result being that the harmful effect of the light that passes through the spaces $t$ separating the regions will have relatively less influence. The unprinted zones N, which become dark when the film is developed, will fill the dead spaces $t$. Of course this aperture of the microscopic lenses $l$ respecting the aperture of the objective cannot be increased extremely far because the fraction of the total sensitized surface employed for the representation of the photographed object is thereby decreased.

But I have discovered that instead of using, as would at first sight seem indicated, an embossing producing microscopic lenses having an aperture corresponding to the aperture of the picture-taking objective, the proper thing is to use an embossing corresponding to a number of lenses per millimeter 10 to 40% less than the number corresponding to the aperture of the picture-taking objective, whether it be a case of picture-taking proper or a case of film reprinting. In other words, the zone $a$ (Fig. 1) must be from 10 to 40% larger than zone $z$.

Goffering of the films can be effected by pressing the plastic film directly against the embossed plate or cylinder M (Fig. 2) by means of a presser roller of sufficient hardness, but then the lines employed have to be given a straight section representing exactly the profile which every one of the refracting lines of the film must have in view of the result aimed at. In Fig. 2, L indicates the recessed or embossed portions of the roller M or other impressing or embossing device, and $r$ the radius of curvature of the hemispherical portions $l$ of the film, the curvature being such that the foci of all the said portions or lenses $l$ will lie in the plane of the sensitized layer $g$.

I have discovered that, as concerns those refracting lines, it is handier and simpler to take advantage of the resiliency of the film in order to obtain the required curvature of the hemicylindrical surfaces of the said film, said surfaces contacting with the embossing device at their origin only and then freely developing within or inside the embossed or recessed portions of said embossing device under the influence of the superficial tension of the film which is adjusted by means of the pressure that said film receives and also by controlling its temperature and its hygrometric degree.

The values of these three factors are determined, say, by pressing the film against the embossing device by means of a counter-device provided with an adjustable weight, by heating up to a predetermined and constant temperature either the embossing device or the counter-device or the two of them, and lastly, by bringing the film to proper hygrometric condition through suitable drying immediately previous to proceeding with its goffering.

I claim as my invention:

1. A method of producing films for projection in colors, which comprises embossing microscopic parallel lines from a recessed hard surface having lines thereon, upon the surface of a film under pressure, and regulating the superficial tension of the film in order to obtain thereby a desired curvature of the microscopic lenticular elements defined by the embossed lines without contact of said curvature with the hard surface.

2. A method according to claim 1, in which the regulation of the superficial tension of the film is effected by regulating the embossing pressure and temperature and hygrometric condition of the film.

3. The process which comprises producing an embossed curved surface upon a film by pressure from a hard surface carrying deeper indentations than and not conforming to the shape of the embossing to be produced.

4. The process which comprises producing an embossed curved surface upon a film by pressure from a hard surface carrying deeper indentations than the embossing to be produced, thereby forming a hemicylindrical surface thereon.

5. The process which comprises producing an embossed curved surface upon a film maintained relatively soft by heat and moisture, by pressure from a hard surface carrying deeper indentations than the embossing to be produced.

6. The process which comprises producing an embossed curved surface upon a film maintained relatively soft by heat and moisture, by pressure from a hard surface carrying deeper indentations than the embossing to be produced, thereby forming a hemicylindrical surface thereon.

In testimony whereof I affix my signature.

ANDRÉ OSWALD.